March 28, 1961 C. PANDOZY 2,977,045
MACHINE FOR PRINTING AND ISSUING CASH REGISTER TICKETS
Filed Jan. 4, 1956 6 Sheets-Sheet 1
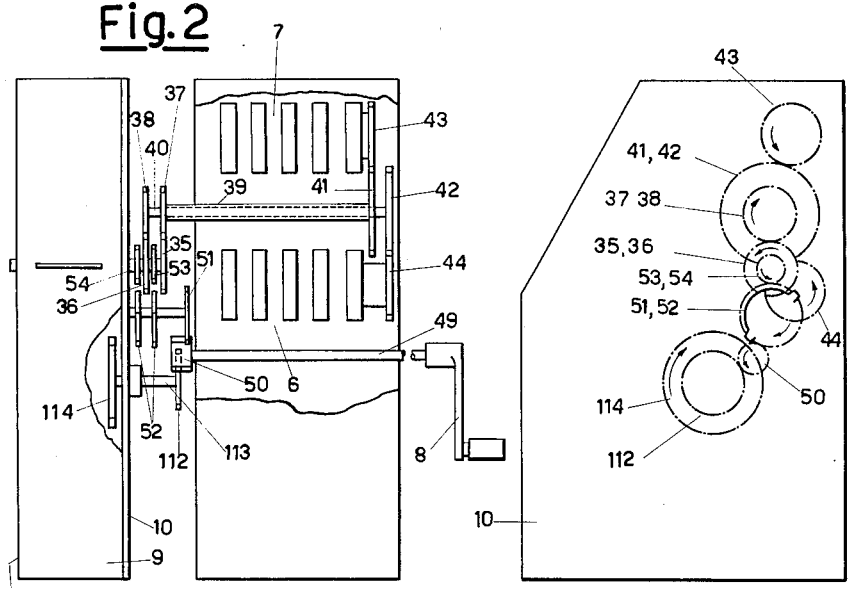
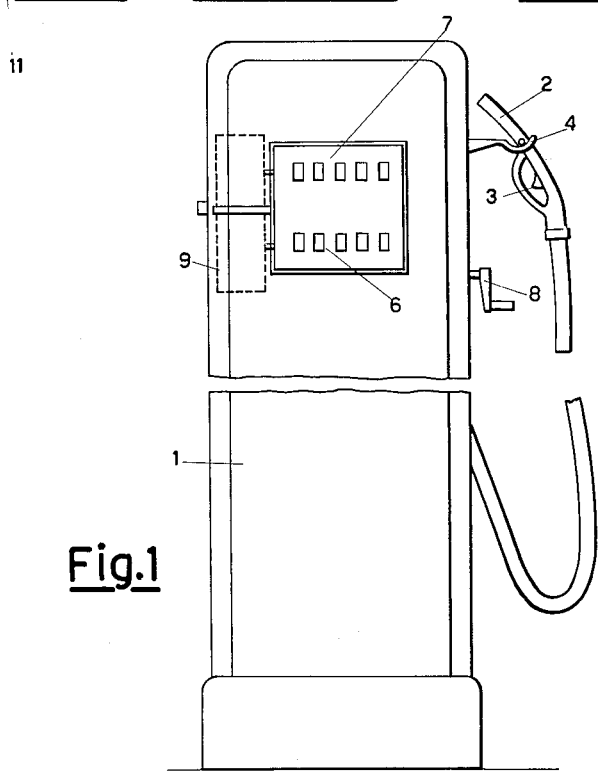
INVENTOR.
Carlo Pandozy
BY
Attorney INVENTOR.
Carlo Pandozy March 28, 1961  C. PANDOZY  2,977,045
MACHINE FOR PRINTING AND ISSUING CASH REGISTER TICKETS
Filed Jan. 4, 1956  6 Sheets-Sheet 3

INVENTOR.
Carlo Pandozy
BY
Attorney

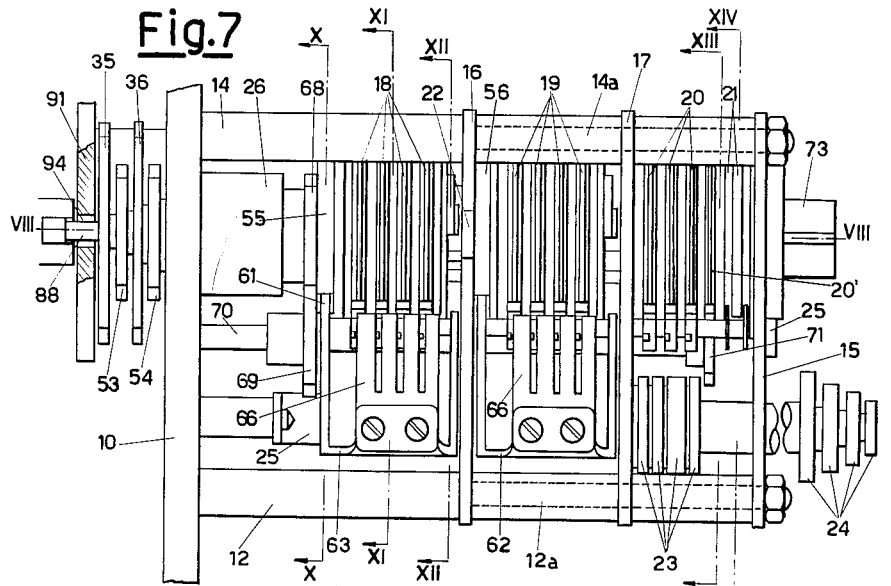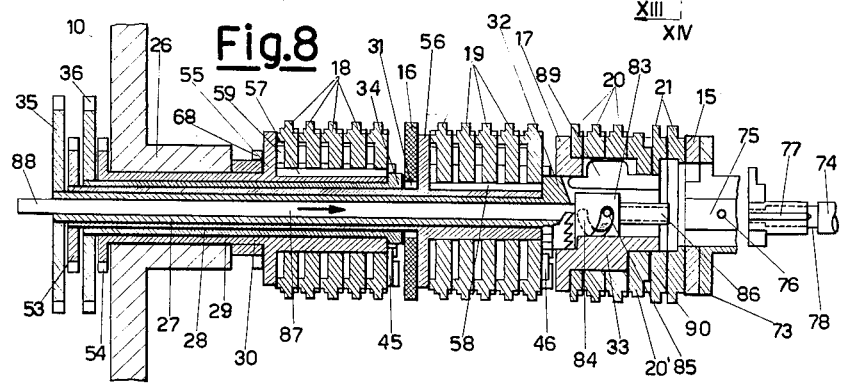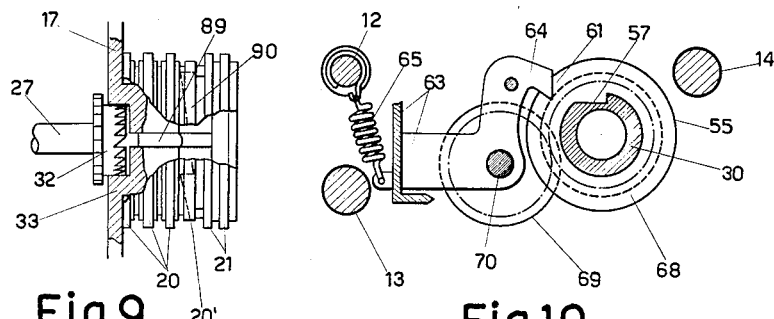

March 28, 1961 C. PANDOZY 2,977,045
MACHINE FOR PRINTING AND ISSUING CASH REGISTER TICKETS
Filed Jan. 4, 1956 6 Sheets-Sheet 5

INVENTOR.
Carlo Pandozy
BY
Attorney

March 28, 1961  C. PANDOZY  2,977,045
MACHINE FOR PRINTING AND ISSUING CASH REGISTER TICKETS
Filed Jan. 4, 1956  6 Sheets-Sheet 6
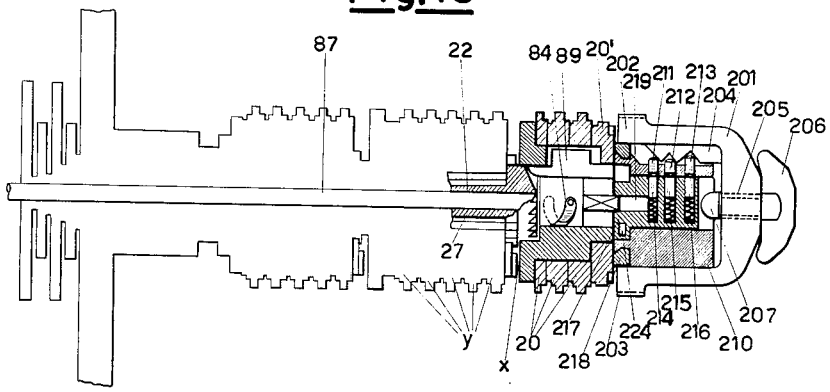
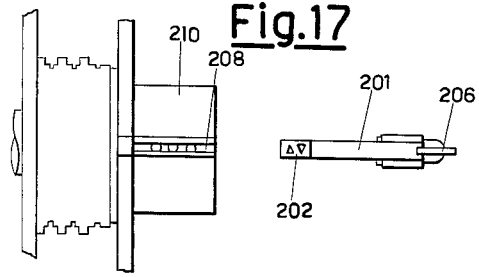
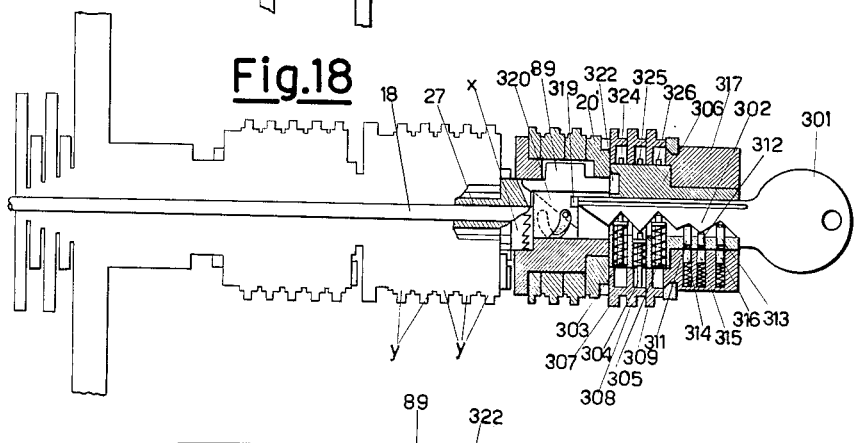
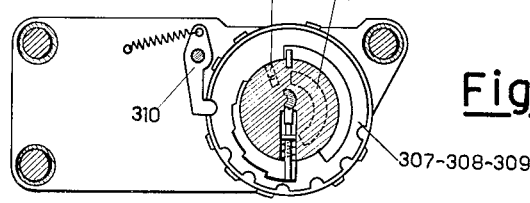
INVENTOR.
Carlo Pandozy
BY
Attorney

United States Patent Office 2,977,045
Patented Mar. 28, 1961

2,977,045
MACHINE FOR PRINTING AND ISSUING CASH REGISTER TICKETS

Carlo Pandozy, Milan, Italy, assignor to G. Pandozy & Figli S.r.l., Milan, Italy Filed Jan. 4, 1956, Ser. No. 557,365

Claims priority, application Italy Sept. 15, 1955

8 Claims. (Cl. 235—94)

The present invention relates to apparatus for measuring, checking or dispensing various products. More particularly, the invention relates to apparatus for dispensing fuels, energy and the like, and to automatic weighing machines or the like, which apparatus are already provided with devices adapted to check the quantities measured or delivered and/or adapted to compute the respective price of the measured or delivered product.

It is a particular object of the invention to provide mechanism applicable to the apparatus specified above, said mechanism being adapted to print and issue a cash register ticket and being moreover combined with a safety device permitting the use of said mechanism and/or the drawing of the products from said apparatus exclusively to authorized people, even if in considerable number.

The mechanism according to the present invention is therefore characterized essentially in that it comprises numbering printing members, means adapted to connect said members with the automatic computing device existing in the apparatus to which the mechanism is applied; a safety device actuating means adapted to unlock the apparatus and to permit use of the mechanism; and further means adapted to cause the printing and issuing of the ticket, the clearing of the numbering printing members and the locking of the apparatus and mechanism at the end of the operation.

The numbering printing members are arranged preferably along one single axis and their control and clearing are carried out concentrically. Connection with the computing device existing in the apparatus takes place for instance by means of toothed gearing. Of the set of numbering members which compose a figure, e.g. to indicate the quantity of product measured or delivered or to indicate the respective price, the existing computing device controls only the first member, which in turn controls by means of planetary gears in a manner known per se the other members belonging to the same figure. Those members are irreversible.

The safety device is constituted preferably by a lock that can be operated by means of distinctive keys only by a certain number of authorized persons. The means co-operating with and controlled by said lock make operation of the whole delivering, measuring, etc. apparatus for the products possible only when there has been previously introduced said key which then remains locked in the machine for the complete cycle of operation and is not removable but at the end thereof.

The means which cause the printing and the issuing of the cash register ticket, the clearing of the numbering printing members and the locking of the apparatus with the contemporaneous release of said key may be operable by hand, e.g. by means of a crank-handle or by any other servomechanism and they are formed essentially of a toothed gearing with cams and levers.

In addition to the printing and issuing of a ticket the mechanism of the invention, can print also a statistical or checking sheet or tape, and moreover, it is possible also to stamp pertinent data on cards, papers etc. This data may be, for instance, the distinctive symbol of the person that has carried out the operation (number or sign corresponding to a specific key), the quantity of product delivered or checked, the amount in currency of the quantity delivered or checked, the progressive number of the operation, the distinctive number of the mechanism; moreover there may be recorded the date at which the operation was carried out, the trademark of the product and/or of the firm, as well as advertising or indicative scripts.

To form the distinctive number of the person that has carried out the operation, the safety lock and every key are provided with mechanisms adapted to act during the operation of unlocking the machine, upon stamping members ciphered with distinctive symbols or numerals which permit all of the combinations corresponding to those of each key.

Numbering sectors form and print the progressive number of each operation while special external knobs connected to numbered printing sectors permit daily printing of the date.

For the printing of the brand or trademark, and of the advertising or indicative scripts there are provided printing members equipped with special printing blocks.

The mechanism is equipped with all members needed for printing, for advancing the paper tape for the ticket or slip, for advancing and reeling the paper tape for the checking sheet, for advancing, reeling and automatic reversing of the copying ribbon, and for cutting the ticket or slip from the respective paper tape.

Moreover, there may be provided devices for locking the apparatus in case of want of paper for the ticket and of paper for the control sheet.

To make the invention clearer, there will be described hereinafter merely by way of example without limitation a possible form of embodiment of the mechanism as applied to a common fuel dispenser (gasoline pump, petrol pump). In the following description, the accompanying drawings are referred to, wherein:

Fig. 1 shows diagrammatically the gasoline pump or petrol pump to which the mechanism according to the invention is applied;

Fig. 2 illustrates the connection between the subject mechanism and the automatic computer of the dispenser pump;

Fig. 3 is another diagrammatical view of the connecting gearings of Fig. 2;

Fig. 7 shows in plan view the assembly of the computing device and of the safety lock of the machine;

Fig. 8 is a longitudinal section along the line VIII—VIII of Fig. 7;

Fig. 9 shows a detail of Fig. 8 partly in view and partly in section;

Figures 10 to 14 are cross-sections along the lines X—X, XI—XI, XII—XII, XIII—XIII, XIV—XIV of Fig. 7 illustrating particularities of the computing device and of the lock;

Figures 16 and 17 are two views, one in section and the other in plan, of the safety device according to one first variant; and Figures 18 and 19 are two views respectively in longitudinal and in cross-section of the safety device according to another variant.

Figure 4:
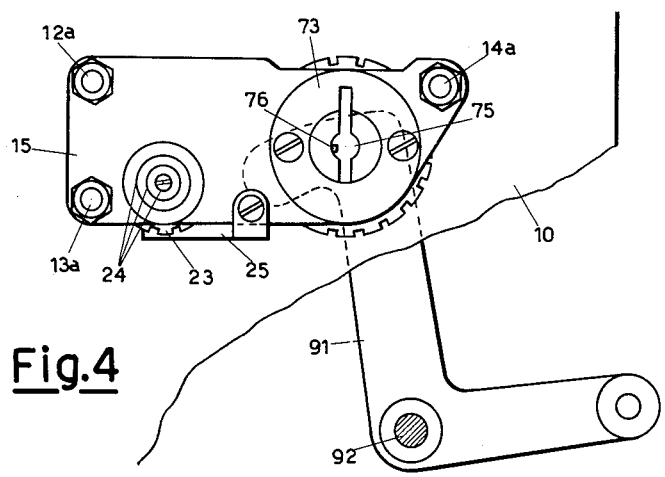
Fig. 4 and Fig. 5 show diagrammatically the means for locking and unlocking the pump.

As visible in Fig. 1, the subject machine is applied, in the case chosen as an example, to a gasoline pump or petrol pump (fuel dispenser) 1 of conventional kind.

Said pump is provided with a delivery tube (gun) 2 and with an actuating button 3, that may be hung on to a supporting fork 4. A switch 5 (Fig. 5) which is actuated owing to the lifting of the fork 4 when the gun 2 is taken off, starts the motor and the delivery pump proper (which are not shown in the drawing). The fuel is delivered on pressing the button 3. Moreover, the dispenser is provided with both an automatic computer 6 of the quantity of fuel delivered and an automatic computer 7 of the cost in currency of said quantity.

Those computers 6 and 7 are of known kind, readable from outside, and are operated by means of the rotation of gears and with the known planetary system. By means of a crank-handle 8 the two computers 6 and 7 may be cleared. To clear, two revolutions of the crank-handle are required.

The subject mechanism is contained in a casing 9 and, therefore, it can be easily applied, e.g., to a gasoline or petrol pump as hereinbefore stated. All the parts composing the mechanism are supported between the two side panels 10 and 11 of the casing 9.

With the wall 10 of the casing 9 there are made rigid three bars 12, 13 and 14 (Fig. 11) carrying two plates 16 and 17 (Fig. 7) spaced from each other as well as a side plate 15 (Fig. 4) fixed to the bars 12, 13 and 14 by means of bolts 12a, 13a and 14a. The framing so formed serves to support the numbering printing members with respective accessory members and the safety lock.

The numbering printing members comprise two sets of numbering discs 18 and 19 (see Figures 7 and 8) arranged coaxially, of which one set of discs 18 serves to stamp the figure indicating the quantity of fuel delivered while the other set of discs 19 serves to stamp the figure indicating the cost in currency. On the same axis as the discs 18 and 19 there are also provided other numbered discs 20 for composing and stamping the progressive number of the operations, and discs 21 provided with numerals and signs for composing and stamping the distinctive sign of the person that has carried out the operation.

On the plate 16 there is fixed in suitable position a printing block or plate 22 carrying the distinctive number of the machine.

In offset relationship with respect to the axis of the discs 18, 19, 20 and 21, there are provided printing sectors 23 connected to special knobs 24 outside the plate 15 for the composing and printing of the date.

Moreover, on the frame formed on the bars 12, 13 and 14 there are fixed printing members provided with special printing blocks or plates 25 for printing fixed and advertisement inscriptions (see Fig. 4).

The numbering printing members constituted by the discs 18 are arranged between the wall 10 and the plate 16; the set of discs 19 are arranged between the plates 16 and 17.

The wall 10 has internally a supporting flange 26 with a through hole wherein there are supported rotatably with respect to one another four concentric tubes 27, 28, 29 and 30 of which the tubes 27 and 28 extend towards the supporting plate 17, passing through a hole 31 of the plate 16, while the tubes 29 and 30 end in the proximity of the plate 16. To one end of the internal tube 27 there is made rigid a serrated coupling member 32 with peripheral and front teeth. The front portion of the member 32 is guided and supported in a bore of the body 33 which is rigid with the plate 17. The intermediate tube 29 is terminated before the plate 16 also with a serrated wheel 34 with exclusively peripheral teeth. At their opposed ends the tubes 27 and 29 terminate in toothed wheels 35 and 36 respectively fitted to the respective tubes outside the wall 10 of the casing 9.

As visible in Fig. 2, the toothed wheels 35 and 36 are in direct engagement at 1:1 ratio with the toothed wheels 37 and 38 respectively fitted on the concentric shafts 39 and 40. To the opposed ends of said shafts 39 and 40 there are made rigid the toothed wheels 41 and 42 respectively which mesh with the toothed wheels 43 and 44 of the automatic computers 6 and 7 provided in the dispenser 1.

Figure 11:
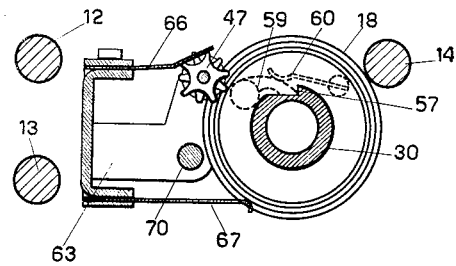
Figure 12:
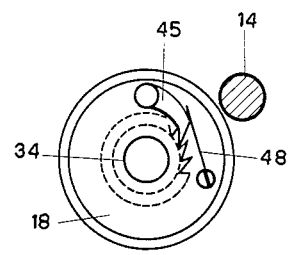

Through this gearing connection the movements of said computers 6 and 7 are transmitted to the serrated wheels 32 and 34 (Fig. 8), which, by means of pawls 45 and 46 respectively pivoted to the first discs of the two sets of numbered discs 18 and 19 (see Fig. 12), transmit the movements to those first discs of the printing computing groups. The transmission to the other discs of said groups is effected in a manner known per se by means of planetary gears 47 (Fig. 11). Elastic tongues 48 (Fig. 12) keep the pawls 45, 46 engaged with the respective serrated wheels 32, 34.

The clearing device for the numbered discs 18, 19 is connected to the one controlled by the crank-handle 8 (Figs. 1 and 2) provided in the dispenser 1.

To the end of the shaft 49 (Fig. 2) carrying the crank-handle 8 there is fixed the pinion 50 which meshes with a toothed wheel 51 on the same shaft of which there are also fixed the toothed wheels 52 having teeth around half only of their peripheries. The teeth of the wheels 52 mesh with toothed wheels 53, 54 fitted respectively to the ends of the tubes 28 and 30 projecting from the wall 10, Fig. 2. Those tubes 28 and 30 which are coaxial with the tubes 27 and 29 are arranged respectively around the tube 27 and around the tube 29 and have each an intermediate flange 55 and 56 (Fig. 8). Around the terminal portion of the tube 30 and between its flange 55 and the serrated wheel 34 there are provided the freely rotatable discs 18; while the discs 19 are arranged around the terminal portion of the tube 28 between its flange 56 and the serrated wheel 32. The tubes 28 and 30 have in said terminal portions external longitudinal grooves 57, 58, respectively, in which for the purpose of clearing the discs 18 and 19, there can engage the pawls 59 pivoted on each of said discs. Said pawls 59 are kept in engagement with tubes 28 and 30 by flat springs 60 (see Fig. 11).

Said flanges 55 and 56 of the tubes 28 and 30 are provided each with a peripheral notch 61 (Fig. 10).

Two frames 62, 63 (Figs. 7, 10 and 11) support the planet wheels 47 and have each a wedge-shaped projection 64 adapted to engage in the respective notch 61 of the flanges 55 and 56. A spring 65 for each frame 62 and 63 acts to keep the wedge-shaped projections 64 engaged in the respective notches 61 in which position also the planet wheels 47 mesh with the discs 18 and 19 respectively. The planet wheels 47 when disengaged from the respective discs 18 and 19 are held in meshing position by means of elastic plates 66. Other elastic plates 67 (Fig. 11) brake the discs 18 and 19.

Figure 13:
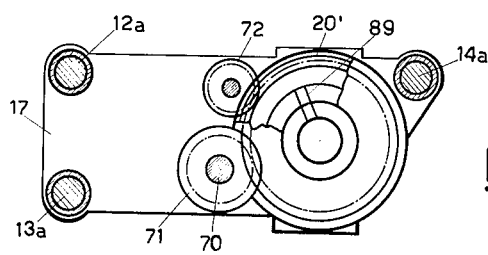

The tube 30 carries a toothed wheel 68 (Figs. 8 and 10) in the proximity of its flange 55. The wheel 68 meshes with a toothed wheel 69 (Fig. 7) fitted on a shaft 70 supported rotatably in the frames 62 and 63. At the other end of the shaft 70 (see Figures 7 and 13) there is fixed the toothed wheel 71 which actuates the disc 20' adapted to control by means of planet wheels 72 the numbered discs 20 forming the progressive number.

A complete rotation of the tube 30 determines the advance of the progressive number by one unit.

As visible in Fig. 8, said discs 20 are arranged freely rotatable about the hollow body 33 rigid with the supporting plate 17 and are aligned with the discs 18 and 19. Between the numbered discs 20 and the side plate 15 there are further provided two discs 21 which too are aligned with the discs 18 and 19. Those discs 21 form part of the safety lock and serve to print the distinctive number corresponding to the key used (Fig.

14). The safety lock comprises a guide member 73 for the key 74 fixed externally to the side plate 15. The guide member 73 has a slot 75 in communication with an analogous slot in the plate 15 corresponding to the external profile of the key.

The terminal portion of the key 74 is cylindrical and hollow and has on its outside a longitudinal groove 77 which opens into another circular groove 78.

Figures 15, 15A:
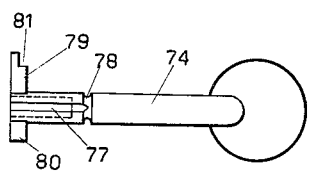
Figures 15 and 15a are two views of a key adapted to be employed with the machine.

At its end the key is provided with two vanes 79 and 80 (Fig. 15) diametrally opposed which with their internal ends project into the bore of the key. The vane 79 is provided with a step 81 determining a certain distance in respect to the centre of the key and different for each individual key.

Figure 14:
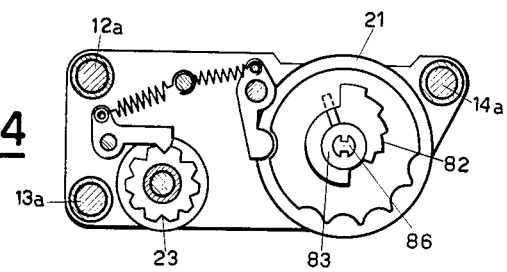

The discs 21 have internally a stepped profile 82 (Fig. 14) with which said vane 79 with its step 81 co-operates during the rotation of the key.

A peg 76 (Fig. 8) provided in the slot 75 of the member 73 slides during the introduction and rotation of the key in the grooves 77 and 78 respectively and as a consequence thereof the key has to be completely introduced before it is possible to rotate it. On the other hand the extraction of the key is possible only in the determined angular position thereof.

Inside the body 33 rigid with the supporting plate 17 there is provided a small cylinder 83 provided peripherally with a slot 84 having helical shape. Said slot 84 engages a peg 85 rigid with the body 33 in such a way that the small cylinder 83 in rotating about its axis performs also a longitudinal displacement. The small cylinder 83 carries an axial extension 86 provided with special grooves wherein there can engage the internal ends of the vanes 79 and 80 of the key 74 (Fig. 8). Opposite the extension 86, the small cylinder 83 is rigid with a rod 87 which is slidable in the tube 27 and which projects from the other side of this tube with its end 88.

Inside the body 33 there is also provided a shaped plate 89 which with one wedge-shaped end of its own co-operates with the front teeth of the wheel 32 (see Figures 8 and 9) while with its other end it is adapted to project into the internal hollow of discs 21 into which pass the vanes 79 and 80 of the key 74 when the latter is introduced into the lock and is rotated.

An upper projecting portion of the plate 89 is adapted to co-operate with a cylindrical cam having an inclined plane 90, rigid internally with the disc 20'. The plate 89 is provided in an inclined plane in respect to the plane of introduction of the vanes 79 and 80 of the key (see Fig. 13) to render it inaccessible from outside. The end 88 of the rod 87 serves as a means for locking the members controlling the delivery of fuel and co-operates with a crank lever 91 (Figs. 4, 5) pivoted at 92 on the wall of the dispenser. One arm of said lever 91 is connected with both the control lever of the switch 5 and the supporting fork 4. This latter connection is effected by means of a gauged spring 93 which prevents the forced actuation of the switch 5 when the lever 91 is locked, that is, when the end 88 of the rod 87 is engaged in a special bore 94 of said lever 91. The lever 91 is provided with a tail 95 for covering the aperture through which the rod 87 is retracted in the tube 27, while it is so retracted, and the lever 91 is displaced angularly about its fulcrum 92.

The apparatus according to the invention is further provided with the mechanisms for printing the ticket or slip and a control sheet.

Figure 6:
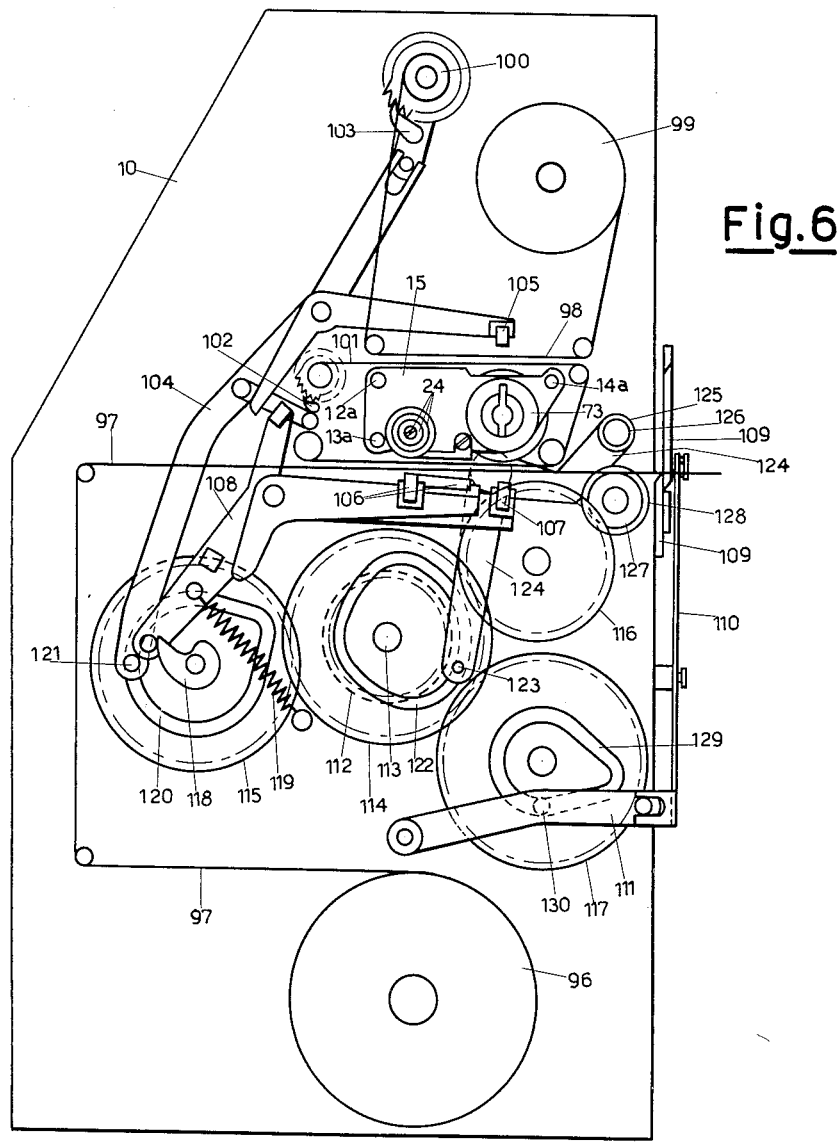
Fig. 6 is a diagrammatical side view of the mechanism for printing the ticket and the control sheet.

In Fig. 6 there is shown the roll 96 from which there unreels the paper tape 97 for the cash register tickets to be printed. The paper tape 97 passes under the printing members and is guided by special rolls. Above said printing members there passes a second paper tape 98 unreeling from roll 99 and reeling up on roll 100.

This second paper tape 98 serves as a control for the operations carried out and remains in the apparatus.

Since the same data are printed on both tapes 97 and 98, the printing members carry equal digits in diametrally opposed positions. It will be understood that on the control tape 98 there are printed only the data which are of interest for the purpose of checking, while the other data such as for instance the date of the day, advertizing texts and the like, are printed exclusively on the lower paper tape 97. A copying ribbon 101 passes both upside and downside between the printing members and the respective paper tapes.

The stamping of the two paper tapes 97 and 98 is determined by stamping members 105, 106 and 107 arranged at the ends of levers which receive a percussion movement from a lever 108 in such a way as to bring said stamping members under pressure against the printing members which are provided with signs or words. The paper tape 97 passes through the shear 109 which is actuated by a connecting rod 110 connected to a lever 111.

The members which control the stamping members, which advance the paper tapes and the copying ribbon and which actuate the shear, are the following:

The pinion 50 fixed on the shaft 49 of the crankhandle 8 (see Fig. 2) meshes not only with the toothed wheel 51 but also with a toothed wheel 112 fitted on a shaft 113 which carries inside the casing 9 a toothed wheel 114. This wheel 114 meshes with the three toothed wheels 115, 116 and 117 (Fig. 6). To the shaft of the wheel 115 there is fixed a cam 118 with which there is held in contact, by means of a spring 119, the end of the lever 108 which controls the stamping members 105, 106 and 107. Moreover the wheel 115 has a cam groove 120 in which there is guided a pin 121 rigid with the end of a lever 104 which carries members 102 and 103 adapted to cause the advancement by the necessary amount of the copying ribbon 101 and of the paper tape 98 respectively.

The wheel 114 too has a cam groove 122 for a pin 123 rigid with the end of a lever 124 which at its other end carries a freely rotatable toothed wheel 125 and a small roll 126. When the lever 124 is lowered, the wheel 125 can mesh with a wheel 127 actuated by the wheel 116 which in turn meshes with the wheel 114. On the axis of the wheel 127 there is fixed the small roll 128 which together with the small roll 126 causes advancement of the paper tape 97 passing between said two small rolls.

Further the wheel 117 has a cam groove 129 for a pin 130 rigid with the lever 111 for controlling the shear 109.

Operation of the machine described above is as follows:

At the beginning of each operation of delivery of fuel, it is necessary to unlock the dispenser and the machine by introducing into the safety lock a special key 74. When the key is introduced completely, the internal ends of its vanes 79 and 80 are engaged in the grooves of the extension 86 of the small cylinder 83 (Fig. 8). By turning now the key by 180° in clockwise rotation, there is caused a rotation of the small cylinder 83 and, at the same time, a longitudinal displacement thereof in the sense of the arrow in Fig. 8. With this displacement, the rod 87 rigid with the small cylinder 83 is retracted into the tube 27, while releasing the lever 91. At the same time, the vane 79 of the key determines a rotation by a certain angle of the discs 21. The angle of rotation of said discs depends on the point at which the step 81 (Fig. 15) of the vane 79 meets the stepped profile 82 (Fig. 14) of said discs and said angle varies evidently in accordance with the different keys. In this way there are prepared for the subsequent stamping the distinctive symbols corresponding to the particular key with which the operation is carried out.

Figure 5:
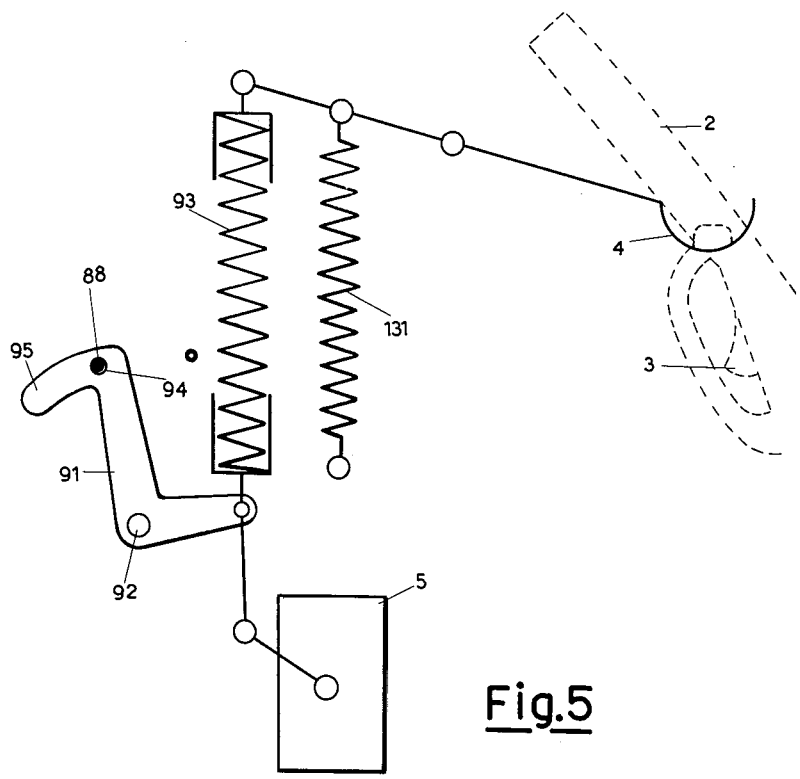

When taking off the delivery nozzle 2, the fork 3 acts through the traction exerted by a spring 131 (Fig. 5)

upon the gauged spring 93, which in turn exerts a pressure upon the unlocked lever 91 in such a way as to actuate the switch 5 which starts the motor and the delivery pump. Delivery begins when the button 3 on the nozzle 2 is depressed; and with the delivery of the fuel there are actuated automatically the counting devices 6 and 7 of the dispenser. These in turn actuate through the connection described, the numbering printing discs 18 and 19 of the apparatus of the invention.

With the rotation of the wheel 32 (Fig. 8), the wedge-shaped end of the shaped plate 89, which was previously housed in a space of the front face of the wheel 32, is pushed out of this space in such a way that the plate 89 is displaced so that its other end comes to project into the interior of the discs 21 and create a hindrance for the lower vane 80 (Fig. 15) of the key which is turned upwards. In this way the key is rendered unextractable. When the delivery of the desired quantity has been attained, the button 3 is released and the pipe 2 is hooked-in again on the fork 4 determining the stopping of the motor and, therefore, of the pump. In order to be able to recover the key, it is necessary now to clear the computing devices with the aid of the crank-handle 8. During this operation the devices of the apparatus act in the following manner. The rotation of the crank-handle determines the rotation of the toothed wheels 52 and 114 (Fig. 2). During a first period the toothed wheels 52 do not mesh with the wheels 53, 54, the teeth of the wheels 52 extending only over half their circumferences. The wheel 114 rotates the wheels 115, 116 and 117 (Fig. 6). The cam 118 releases immediately the lever 108 (in Fig. 6 there is illustrated the position at the beginning of the movement) which under the action of the spring 119 determines a movement of percussion of the beaters 105, 106 and 107 and, thereby, the contemporaneous stamping of all of the data aforementioned, at one side on the paper tape 97 and on the other side on the paper tape 98.

After stamping, the lever 124 goes down owing to the rotation of the cam groove 122, and makes the toothed wheel 125 mesh with the toothed wheel 127 which is already in movement. In that way, the two rolls 126 and 128 move forward the tape 97 by an amount determining the length of the ticket or slip. The lever 124 is then automatically raised again and the tape 97 stops again, ready for a subsequent stamping operation.

Simultaneously with this operation, also the lever 104 lowers by effect of the rotation of the cam groove 120; and the members 102 and 103 advance the copying ribbon 101 and the paper tape 98 by the necessary amount.

Subsequently the teeth of the wheel 52 come into mesh with the wheels 53 and 54 causing rotation of the tubes 28 and 30 (Fig. 8). The wedge-shaped projections 64 of the frames 62 and 63 leave the respective notches 61 of the flanges 55 and 56 (Fig. 10) in such a manner as to disengage the planet wheels 47 (Fig. 11) from the discs 18 and 19. The small elastic plates 67 brake all the discs 18 and 19.

The longitudinal grooves 57, 58 (Fig. 8) of the tubes 28 and 30 meet in their rotation progressively the pawls 59 of the discs 18 and 19, taking these to zero position (see Fig. 11).

At the same time, the toothed wheel 68 (Figs. 8 and 10) rigid with the tube 30 rotates the shaft 70 and actuates, by means of the wheel 71, the disc 20' of the progressively numbering computer, determining an advance by one unit. The disc 20' with its cam having an inclined plane 90 (Fig. 9), acts upon the upper portion of the small plate 89 and makes it engage, with its wedge-shaped end, in a tooth space of the front face of the wheel 32. In this way the key 74 is again free and removable viz. extractable.

During this clearing operation, the tubes 27 and 29 are at rest and the pawls 45, 46 ratchet along the teeth of the respective serrated wheels 32 and 34. At the same time, the cam groove 129 (Fig. 6) lowers in its rotation the lever 111 thus actuating the shear 109 in such a way as to detach the printed ticket from the tape 97.

At this time the operation is finished and the operator can carry out a new operation or lock the machine and the delivery device, and recover his key. In this latter case he turns the key by 180° in counter-clockwise sense causing in this way a displacement of the small cylinder 83 and of the rod 87 in a sense contrary to that of the arrow in Fig. 8. The end 88 of the rod 87 leaves the tube 27 and moves into the bore 94 of the lever 91 thus locking the delivery device.

In Figures 16–17 there is illustrated one of the possible variants in the safety device in the case in which a printing key is used and in Figures 18–19 there is illustrated a second variant of the safety device in the case in which a non-interpretable key is used.

The safety device illustrated in Figures 16 and 17 comprises essentially a drum lock operating with the well-known system with pegs distinguished in two series.

The first series 211—212—213 is housed in the holes of the member 210 rigid with the small shoulder 218 and each peg is of a determined length. The second series of pegs 214—215—216 is housed in the holes of the core 217 and each peg is pushed towards the outside by springs.

The key is characterized by a fork 201 at the ends whereof there are fixed the bosses 202—203 which carry engraved in relief one or more symbols or marks distinguishing each key.

Inside the fork there is fixed the small plate 204 the profile of which permits the unlocking of the core 217 of the lock.

The central portion of the key includes a longitudinal hole where there is accommodated the pin that connects the thumb piece 206 with the bolt 207.

The locking of the lock is obtained by means of the pegs 214—215—216, which, being pushed towards the outside by the springs, project over the diameter of shim adjustment of the core 217 and enter into the holes of the member 210 preventing said core 217 from rotating.

The locking of the apparatus is synchronized with the locking of the lock by means of the connection between the hole 219 having square cross-section of the core 217, with the extension, having a square cross-section, of the rod 87.

The unlocking of the lock is obtained by first introducing the key 201 completely into the groove 208, Fig. 17, of the member 210. When the dowels 202—203 are in printing position, the plate 204 causes the pegs 211—212—213 to lower the pegs 214—215—216 down to the diameter of shim adjustment of the core 217. The unlocking of the apparatus is carried out by rotation by 180° in clockwise sense of the thumb-piece 206 which, being rigid with the bolt 207, carries along with it the core 217; the rod connected with the latter performs in rotating a longitudinal displacement owing to the groove 84, and enters again into the tube 27.

The beginning of delivery determines the movement of the wheel with front teeth (X) of the group of discs (Y); and the plate 89 projects over the plane of contact of the core 217 and accommodates itself in the space obtained in the members 210—217; and the dowel 224 rigid with the core 217, which now is turned upwards owing to the unlocking operation just described, prevents the return rotation of said core 217 as well as of the thumb-piece of the key. However, the pegs 211—212—213, which are inserted between the grooves of the plate 204 and the surface of shim adjustment of the core 217, prevent the key from being removed.

With the clearing of the computing members, the inclined plane of the first disc 20' retracts the plate 89 enabling the rotation in the contrary sense of the core 217 which in returning to the starting position unlocks the key, rendering it thus recoverable.

According to the embodiment illustrated in Figures 18 and 19, the safety device is again constituted by a peg-operated drum type lock, but in this case the key is not interpretable, that is to say, it does not carry its own mark engraved on it; but it is provided with supplemental teeth adapted to pre-set the discs of the marks inside the lock in the printing position corresponding thereto.

The key is formed by a disc-shaped handgrip 301 from which there extends the plate 302 having a shaped section which in its lower profile presents two distinct series of projections and recesses.

The first series determines the composition of the distinctive symbols for each key, the second series determines the unlocking of the lock (constituted with the well-known peg-system).

The rotation of the key by 180° in clockwise sense determines the unlocking of the apparatus and the composition of the distinctive symbols of every key.

The composition of the distinctive symbols is determined by the dimensions of the projections and recesses of the first series. When the key is introduced, the members 303—304—305 assume the positions determined by said dimensions and project from the core 306 by a determined amount. With the rotation by 180° of the key, the portions of the members 303—304—305 which project from the core 306 meet progressively the corresponding steps of the discs 307—308—309 carrying these along for the remaining stroke and taking them with the corresponding symbols to the printing position.

The members 310 cause the setting of the discs 307—308—309 during the whole time of the operation (Fig. 4).

The unlocking of the lock is determined by the second series of projections and recesses which, when the key has been introduced, act upon the pegs 311—312—313 to push the pegs 314—315—316 to the point where the core 306 is released from the member 317.

The unlocking of the apparatus is determined by transmitting the rotation by 180° of the lock to the rod 87 which performs a longitudinal displacement, returning into the tube 27.

The extension of the key 319 when introduced into the groove 320 of the rod 87 establishes the connection between the lock and the locking of the apparatus. The beginning of the delivery determines the rotation of the wheel with front teeth (X) of the group (Y) and the plate 89 accommodates itself in the groove symmetrical and diametrally opposed to the groove 322 of the core 306 preventing the rotation in the contrary sense of said core 306 while the pegs 311—312—313, being between the second series of recesses and projections of the key and the surface of shim adjustment of the member 317, prevents extraction of the key, thus rendering it nonrecoverable.

When clearing the computing members, by virtue of the inclined plane of the disc 20' the plate 89 is retracted in the groove 322 and the core remains unlocked. When the key is rotated in the contrary sense, the members 324—325—326 return the discs 307—308—309 to the starting position; the extension 319 returns the rod 87 to the locking position and finally the pegs 311—312—313, in returning to correspond with the holes of the member 317, permit removal of the key.

Obviously the mechanical means of the apparatus hereinbefore described may undergo various modifications and may be replaced with analogous means without departing from the scope of the present invention.

Finally there may be provided additional means for locking the machine in case of want of paper for the ticket and/or of paper for the control sheet.

I claim:

1. The combination with apparatus for dispensing liquid fuel having a pump for pumping said fuel, an electric motor for driving said pump, a switch for controlling said motor, separate computing means, operated by delivery of fuel, for registering the quantity and cost, respectively, of the fuel delivered, and a movable member for closing said switch and actuating said separate computing means, of an attachment for said apparatus comprising a first set of printing discs for printing the quantity of fuel delivered, a second set of printing discs for printing the cost thereof, an identifying printing disc having different indicia around its periphery to denote, respectively, different possible purchasers of fuel, key-operated means for locking said movable member against movement, said last-named means being releasable upon insertion into and rotation in the attachment of a removable key belonging to a purchaser of fuel, said identifying printing disc being positioned to be rotatably advanced upon rotation of said key to bring into operative position the indicia identifying the purchaser simultaneously with the release of said locking means, a recording medium, means for driving said first and second sets of printing discs from and simultaneously with said separate computing means, respectively, to advance into operative position symbols for printing the quantity and cost of the fuel delivered, and means for causing said two sets of printing discs and said identifying printing discs to print upon said recording medium when the delivery operation is completed.

2. The combination with apparatus for dispensing liquid fuel having a pump for pumping the fuel, an electric motor for driving said pump, a switch for controlling said motor, a movable member for tripping said switch and separate computing means, operated by delivery of fuel, for registering the quantity and cost, respectively, of the fuel delivered, of an attachment for said apparatus comprising a first set of printing discs for printing the quantity of fuel delivered, a second set of printing discs for printing the cost thereof, an identifying printing disc having different indicia around its periphery to denote, respectively, different possible purchasers of fuel, means for locking said movable member against movement, said last-named means being releasable upon insertion into and rotation in the apparatus of a removable key belonging to a purchaser of fuel, said identifying printing disc being positioned to be rotatably advanced upon rotation of said key to bring into operative position the indicia identifying the purchaser simultaneously with the release of said locking means, a recording medium, means for driving said first and second sets of printing discs from and simultaneously with said separate computing means, respectively, to advance into operative position symbols for printing the quantity and cost of the fuel delivered, manually-actuatable resetting means, and means driven upon actuation of said resetting means for causing said two sets of printing discs and said identifying printing disc to print upon said recording medium, and means connecting said resetting means to said computing means to reset said computing means to zero upon actuation of said resetting means, said resetting means having a lost-motion connection with said two sets of printing discs to reset said two sets of discs also to zero upon actuation of said resetting means but only after the printing operation on the recording medium has been effected.

3. The combination as claimed in claim 2 in which the two sets of printing discs and said identifying printing disc are coaxial but axially spaced from one another.

4. The combination with apparatus for dispensing liquid fuel having separate computing means, operated by delivery of fuel, for registering the quantity and cost, respectively, of the fuel delivered, of an attachment for said apparatus comprising two coaxial shafts mounted one within the other but of different lengths, respectively, a plurality of coaxial printing discs constituting a set for printing the quantity of fuel delivered, a second set of a plurality of printing discs for printing the cost of said quantity of fuel, said two sets of printing discs being coaxial with said shafts but being displaced axially from one another, and means for driving said two sets of discs simultaneously with said separate computing means, respectively, comprising a ratchet wheel secured to each shaft, a pawl pivotally mounted on one disc of each set to engage said ratchet wheel, a gear fixedly secured to each disc of each set, and a pinion meshing with each of said gears, the pinions meshing with the gears of each set of discs being secured to rotate together.

5. The combination with apparatus for dispensing measurable quantities having separate computing means, operated by delivery of said quantities, of an attachment for said apparatus comprising two coaxial shafts mounted one within the other that are different lengths, respectively, a plurality of coaxial printing discs constituting a set for printing one measurable quantity, a second set of a plurality of printing discs for printing the other measurable quantity, said two sets of printing discs being coaxial with said shafts but being displaced axially from one another, means for driving said two sets of discs simultaneously with said separate computing means, respectively, comprising a ratchet wheel secured to each shaft, a pawl pivotally mounted on one disc of each set to engage said ratchet wheel, a gear fixedly secured to each disc of each set, a pinion meshing with each of said gears, the pinions meshing with the gears of each set of discs being secured to rotate together, a resetting means for rotating said shaft and for simultaneously actuating said computing means to reset said printing discs and said computing means to zero, said resetting means comprising two other shafts journaled in said attachment coaxially with the first named two shafts, the four shafts being mounted one within another, a gear fixedly secured to each of said two other shafts, and means for rotating said last-named gears, comprising a pawl pivotally mounted on each of said two other shafts, each of the first-named two shafts having an axial slot therein in which one of the last two named pawls is adapted to engage.

6. The combination as claimed in claim 5 in which said attachment has a recording medium, an inked printing ribbon interposed between said recording medium and said printing discs, a member for pressing said recording medium and said ribbon against said printing discs to effect printing of said medium, means for gripping said recording medium to feed said medium forwardly, means for severing said medium, a cam for controlling said pressing member, a cam for controlling said gripping means, a cam for controlling said severing means, gearing for driving said cams simultaneously in timed relation, manually-operated means for rotating said gearing, and means, including a pair of segmental gears, for driving said other two shafts upon actuation of said manually-operated means, said segmental gears being mounted so that in any cycle said gearing is actuated to effect operation of said pressing member before said other two shafts are actuated.

7. The combination with apparatus for dispensing liquid fuel having a pump for pumping said fuel, an electric motor for driving said pump, a switch for controlling said motor, a movable member for tripping said switch, separate rotatable computing means, operated by delivery of fuel, for registering the quantity and cost, respectively, of the fuel delivered, and means including a manually-rotatable shaft for resetting said computing means to zero, of an attachment for said apparatus comprising four coaxial shafts mounted within one another, a plurality of coaxial printing discs constituting a set for printing the quantity of fuel delivered, a second set of a plurality of printing discs for printing the cost of said quantity of fuel, said two sets of printing discs being coaxial with said shafts but being displaced axially from one another, each of said printing discs having a series of successive digits around its periphery, an identifying printing disc mounted coaxially with said two sets of discs but displaced axially therefrom, said identifying printing disc having different indicia around its periphery to denote, respectively, different possible purchasers of fuel, means for locking said movable member against movement, said locking means being releasable upon insertion into and rotation in said attachment of a removable key belonging to a purchaser of the fuel, said identifying printing disc being positioned to be rotatably advanced upon rotation of said key to bring into operative position, simultaneously with release of said locking means, the indicia identifying the purchaser to whom the key belongs, means for driving said two sets of printing discs simultaneously with said separate computing means, respectively, comprising gearing connected to each computing means to be driven upon rotation of the computing means and to drive in time therewith two of said coaxial shafts, respectively, two ratchet wheels secured respectively, to said two coaxial shafts, a pawl mounted on one disc of each set of discs to engage said ratchet wheel, a gear fixedly secured to each disc of each set, and a pinion meshing with each of said gears, the pinions meshing with the gears of each set of discs being secured to rotate together, a recording medium, and inked printing ribbon interposed between said medium and all said printing discs, a member for pressing said recording medium and said ribbon against said printing discs to effect printing of said medium, means for gripping said recording medium to feed said medium forwardly, means for severing said medium, a cam for controlling said pressing member, a cam for controlling said severing medium, a cam for controlling said gripping means, gearing for driving said cams in timed relation from said manually-rotatable shaft upon rotation thereof, and means for driving said two other coaxial shafts upon rotation of said manually-rotatable shaft to reset said sets of printing discs and said computing means including two segmental gears, two pawls secured, respectively, to each of said other two coaxial shafts, and a slot in each of the two first-named coaxial shafts in which one of the two last-named pawls engages, said segmental gears being mounted so that in any cycle the last-named gearing is actuated to effect operation of said pressing member before said other two coaxial shafts are rotated.

8. The combination of apparatus provided with separate computing means, for separately registering two measurable quantities, of an attachment for said apparatus comprising a first set of printing discs for printing one of said measurable quantities, a first shaft connecting said first set of discs to one another, a second set of printing discs for printing another of said measurable quantities, a second shaft mounted coaxially with said first shaft connecting said second set of discs, said two sets being axially displaced from one another, means for connecting said two coaxial shafts with said separate computing means, respectively, to rotatably index said two sets of printing discs in accordance with the computed measured quantities, respectively, a recording medium, lock means adapted to cause the engagement and disengagement of said printing discs with said recording medium, manually actuable means for resetting said computing means to zero, and means connecting said resetting means to said means for causing said printing means to print and to said two sets of discs, to actuate first said means for causing said printing means to print and then to reset said discs, upon actuation of said resetting means.

References Cited in the file of this patent

UNITED STATES PATENTS

| | | |
|---|---|---|
| 1,299,786 | Schantz | Apr. 8, 1919 |
| 2,010,642 | Peirce | Aug. 6, 1935 |
| 2,282,120 | Demeulenaere | May 5, 1942 |
| 2,328,435 | Eickmeyer et al. | Aug. 31, 1943 |
| 2,554,296 | Crews | May 22, 1951 |
| 2,714,049 | Germann | July 26, 1955 |
| 2,740,581 | Kamusin | Apr. 3, 1956 |
| 2,903,184 | Weatherby | Sept. 8, 1959 |